US005494438A

United States Patent [19]

Yang

[11] Patent Number: 5,494,438

[45] Date of Patent: Feb. 27, 1996

[54] SUDDEN EXPANSION COMBUSTION CHAMBER WITH SLOTTED INLET PORT

[75] Inventor: Jing-Tang Yang, Hsinchu, Taiwan

[73] Assignee: National Science Council, Taipei, Taiwan

[21] Appl. No.: 427,067

[22] Filed: Apr. 24, 1995

Related U.S. Application Data

[63] Continuation of Ser. No. 193,258, Feb. 8, 1994, abandoned.

[51] Int. Cl.[6] .............................. F23D 14/70; F02C 7/04

[52] U.S. Cl. .............................. 431/350; 60/251; 60/750; 60/751

[58] Field of Search .............................. 60/251, 253, 255, 60/270.1, 751, 750; 431/350, 354, 1, 8

[56] References Cited

U.S. PATENT DOCUMENTS

| | | | |
|---|---|---|---|
| 4,137,712 | 2/1979 | Holzman | 60/251 |
| 4,441,312 | 4/1984 | Smith | 60/251 |
| 4,628,688 | 12/1986 | Keirsey | 60/251 |
| 5,253,474 | 10/1993 | Correa et al. | 60/270.1 |

FOREIGN PATENT DOCUMENTS

| | | | |
|---|---|---|---|
| 5195872 | 8/1993 | Japan | 60/251 |

*Primary Examiner*—Richard A. Bertsch
*Assistant Examiner*—William Wicker
*Attorney, Agent, or Firm*—W. Wayne Liauh

[57] ABSTRACT

A sudden expansion combustion chamber comprising a combustion chamber, an inlet port, a backward-facing step layer provided in the combustion chamber having a predetermined thickness so as define the inlet port, and an after-mixing chamber. The sudden expansion combustion chamber is characterized in that it contains at least a slot provided in the backward-facing step layer so as to increase the recirculating flow rate and turbulence of the incoming air, and thus reduce ignition delay.

5 Claims, 3 Drawing Sheets

11

2 3 31 1

2 3 31 1

SUDDEN EXPANSION COMBUSTION CHAMBER WITH SLOTTED INLET PORT

This application is a continuation of Ser. No. 08/193,258, filed Feb. 8, 1994, now abandoned.

The jet propulsion systems used in rocket, ramjet and certain industrial furnaces or gas turbines all possess the same problem of gas velocity being faster than the flame speed. Hence, the gas and fuel are unable to mix sufficiently in a stabilized combustion manner. Therefore devices such as a swirler, bluff body, or backward facing step, etc. are used for the purpose of holding a flame stable. Heretofore, a solid-fuel ramjet of the jet propulsion engine type is of the air-breathing variety of propulsive unit that captures oxygen from air. It has a small mass and its construction is not complicated like a turbo-engine, nor is it required to have a complicated fueling system and fuel tanks. (the liquid-fuel-type ramjet.) This engine also possessed advantages of low cost, high specific impulse and high reliability, giving this propulsion system great development potential.

The sudden expansion combustion chamber, as the major structure of solid fuel ramjet (SFRJ) illustrated in FIG. 1, comprises an inlet flow (2), backward facing step (3), solid fuel (12), after mixing chamber (4) and nozzle (5). After the fluid passes the separation point of the backward-facing step, a shear layer is generated due to its unstabilized-flow-speed; the pressure gradient in the reversed direction formed in the flow field of the backward-facing step causes the shear layer to be curved downward until it contacts the wall surface at the reattachment zone. Hence, a recirculation zone is formed before the reattachment zone and a redeveloped boundary layer is formed after the reattachment zone. As fluid passes the reattachment zone, a portion of it enters the recirculation zone through the flow field and brings oxygen carried by the shear layer into the recirculation zone; thus, a much improved mixing effect is to be expected from this strong disturbance force in the recirculation zone. Moreover, since the flow speed in this field is small, gaseous fuel can mix sufficiently with the oxygen carried by the shear layer to the recirculation nozzle for stabilized combustion. Therefore, the backward-facing step becomes an effective flame-holding device for the sudden expansion combustion chamber.

However, the geometric configuration of the steps in the area near the separation point makes this most sensitive to the flow field in the backward-facing step, in other words, the main inlet port for sudden expansion combustion chamber. A slight alteration of the combustor's inlet greatly affects the features of the flow field in the combustor. For example, the reattachment length, maximum recirculating flow rate, turbulence intensity, etc., are all affected by an alteration of this geometric configuration. The alteration of the characteristics of the flow field also modifies the heat transfer at the wall surface. This also affects the pyrolysis rate of solid fuel as well as the altered mixing result in the recirculation zone, which further relates to the ignition of the solid fuel, flame holding in the combustion chamber as well as combustion efficiency.

Although the foregoing known type backward-facing step is of simple construction with good flame stability, and is commonly used in various kinds of combustion systems, the status of its flow field is rather complicated. Many related articles on the subject are all concentrated on the characteristics of the flow field, such as the length of the recirculation zone, the rate of recirculating flow, the profile of velocity and turbulence intensity. Therefore, related problems such as flame-holding ability, ignition delay for combustion chamber of SFRJ still exist and require a suitable solution.

THE PURPOSE OF THE INVENTION

The major purpose of this invention is to provide an altered geometric configuration of the step that significantly shortens the ignition delay for a solid fuel ramjet engine as well as to improve its flame-holding character.

The second purpose of this invention is to increase the flame-holding ability without inducing pressure loss by using a slotted-type inlet port so as to avoid the consequences created by the previous method. The previous method does achieve improved features of flame holding and correspondingly shortened ignition delay which increases height of the step but suffers from incremental high pressure loss.

The third purpose of this invention is to provide this slotted-type inlet port as a substitute for various conventional methods without making significant alterations to the construction of a known-type combustion chamber. This slotted system is applicable to combustion chambers of any kind.

1. T=800° C. V=15 m/s $[O_2]$=15%
2. T=800° C. V=15 m/s $[O_2]$=13%
3. T=780° C. V=15 m/s $[O_2]$=15%

A: known-type sudden expansion combustion chamber

B: Sudden Expansion Combustion Chamber

Figure 1A:
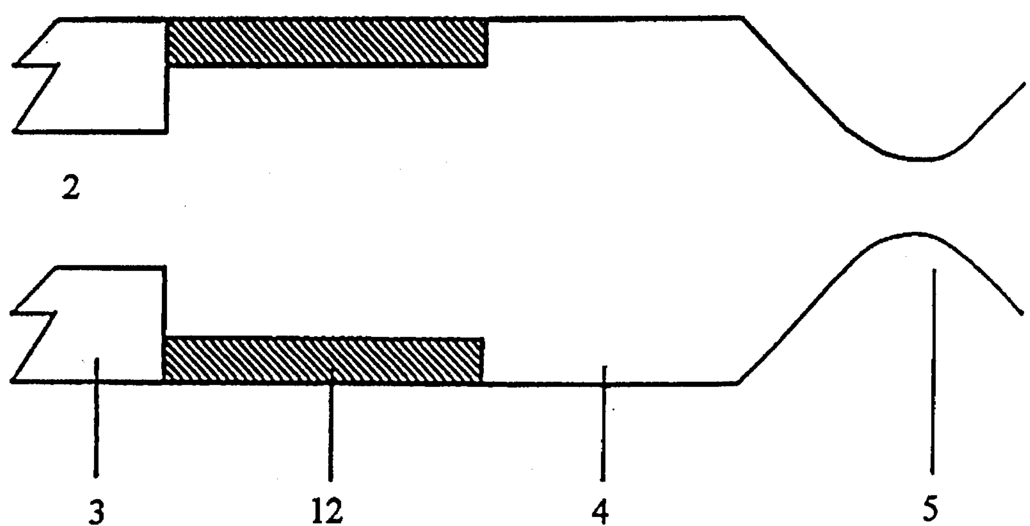
FIGS. 1A and 1B are a schematic drawings of a known-type sudden expansion combustion chamber.
Figure 1B:
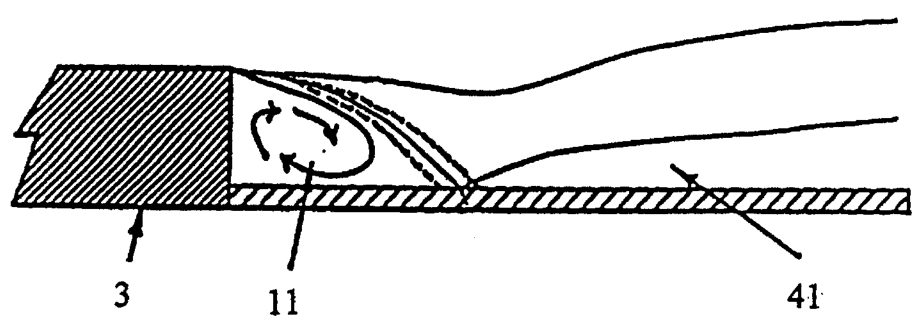
Figure 2A:
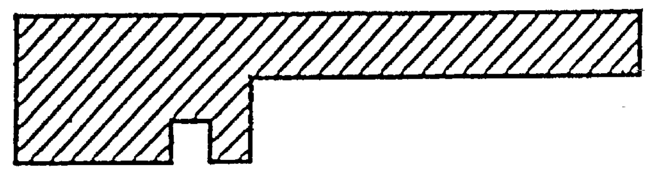
FIG. 2A is a schematic drawing of a sudden expansion combustion chamber according to a preferred embodiment of the present invention which shows one laterally extending slot formed in the backward-facing step layer.
Figure 2A:
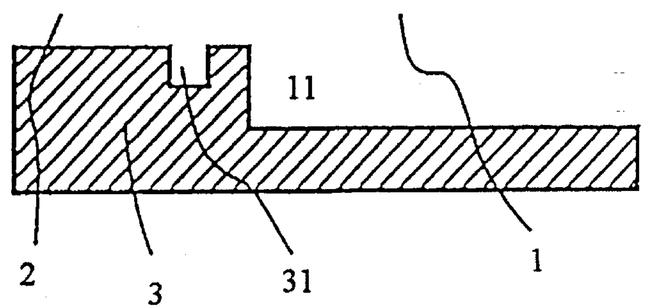
Figure 2B:
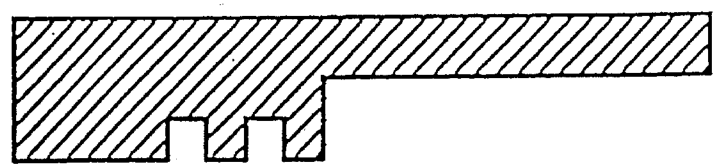
FIG. 2B is a schematic drawing of a sudden expansion combustion chamber according to another preferred embodiment of the present invention which shows two laterally extending slots formed in the backward-facing step layer.
Figure 2B:
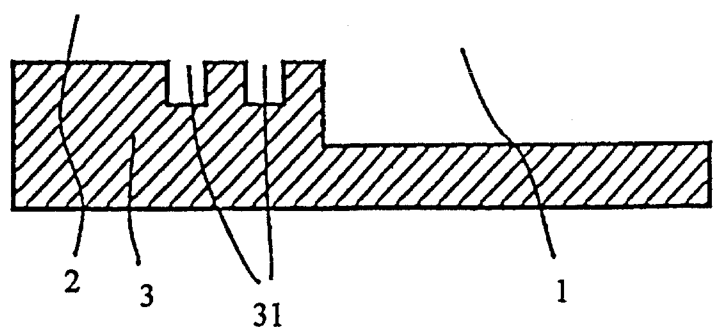
Figure 3:
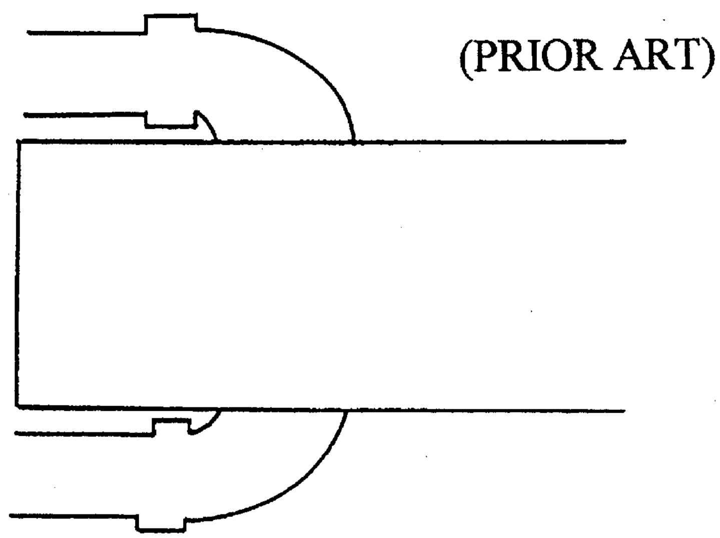
FIG. 3 is a schematic drawing of a sudden expansion combustion chamber of a side-dump combustor.

REFERENCE NUMBER (1) combustion chamber (2) inlet port (3) step (4) after-mixing chamber (5) nozzle (11) recirculation zone (12) fuel (31) slot (41) redeveloped boundary layer (111) shear layer As indicated in FIG. 1A and 1B, a known type SECC consists of: a inlet port, (2), a backward-facing step (3), solid fuel (12), after mixing chamber (4) and nozzle (5). As shown in FIG. 2A and 2B, the slotted type SECC inlet port makes one or more slots (31) on the surface of the backward-facing step, which is also the main inlet port before the entrance to the combustion chamber. The width and depth of these slots are not rigidly specified, preferably less than one third the height of the step. The configuration of this main inlet can be cylindrical or flat which varies with SECC: In the case of a cylindrical shape the slot shall be configured in a recessed cylindrical shape, and in the case of a flat shape, the slots shall be located on the upper and lower sides of confronting backward facing steps. As shown in FIG. 3, the SECC of a side-dump combustor is also a common type of combustion chamber. Its construction differs from that of FIGS. 1A and B and 2A and B. But its principles are all the same. Therefore, the slot system of this invention is also applicable to the backward facing step shown in FIG. 3.

Figure 4:
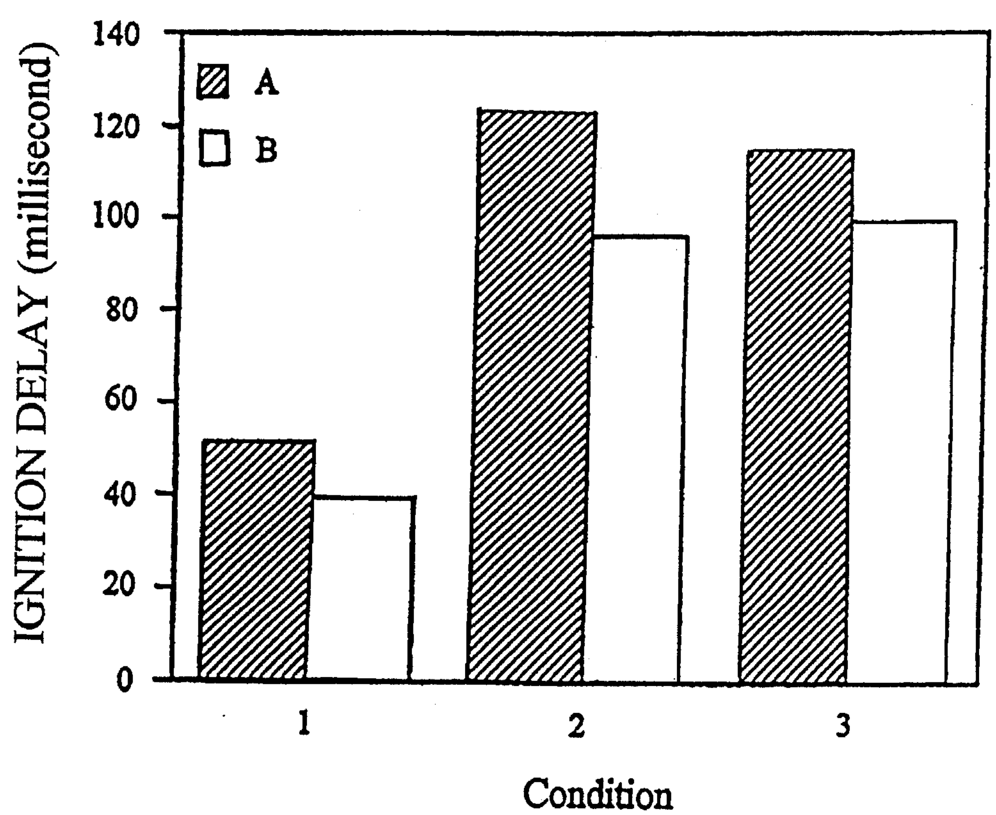
FIG. 4 is a chart showing the relationship between inlet port and ignition delay of solid fuel under the conditions.

FIG. 4 shows a comparison of the status of ignition delay for the solid fuel in a combustion chamber between conventional type of combustion chambers and a slotted-type SECC of this invention under the conditions of temperature 780–800°C., inlet velocity 15 m/s and oxygen content 13–15%. Although the height of steps for both types are 29 mm, we found that by making a single slot according to this invention with its width and depth 10×10 $mm^2$ and counting the ignition delay by seconds for the SECC of this invention the delay is shorter than that of the conventional SECC under various conditions.

In view of the above, the slotted-type inlet port for a SECC is a novel design that improves the combustion efficiency, has a value of practical use and is a solution to eliminate the deficiency of great pressure loss resulting from increased step height.

Obviously, a person skilled in this technology will realize that various modifications and variations of the present invention are possible in the light of the above teaching. It is therefore to be understood that within the scope of the appended claims of the invention may be practised variations otherwise than specifically described.

I claim:

1. A sudden expansion combustion chamber comprising an inlet port, a backward-facing step layer having a predetermined thickness defining said inlet port, and an after-mixing chamber, said sudden expansion combustion chamber being characterized in that it contains at least a slot provided in said backward-facing step layer, which is extending along a lateral direction transversal to a longitudinal axial direction of said combustion chamber, so as to increase recirculating flow rate and turbulence, and thus reduce ignition delay.

2. A sudden expansion combustion chamber as claimed in claim 6, wherein said slot having a depth less than one third of the thickness of said backward-facing step layer.

3. A sudden expansion combustion chamber as claimed in claim 1, wherein said combustion chamber, said after-mixing chamber, and said backward-facing step layer are of a cylindrical shape, and said slot is a circularly extending slot transversal to said axial direction of said combustion chamber.

4. A sudden expansion combustion chamber as claimed in claim 1, wherein said combustion chamber is a side dump combustor.

5. A sudden expansion combustion chamber as claimed in claim 1, wherein two or more slots are provided in said backward-facing step layer.

* * * * *